Patented July 25, 1950

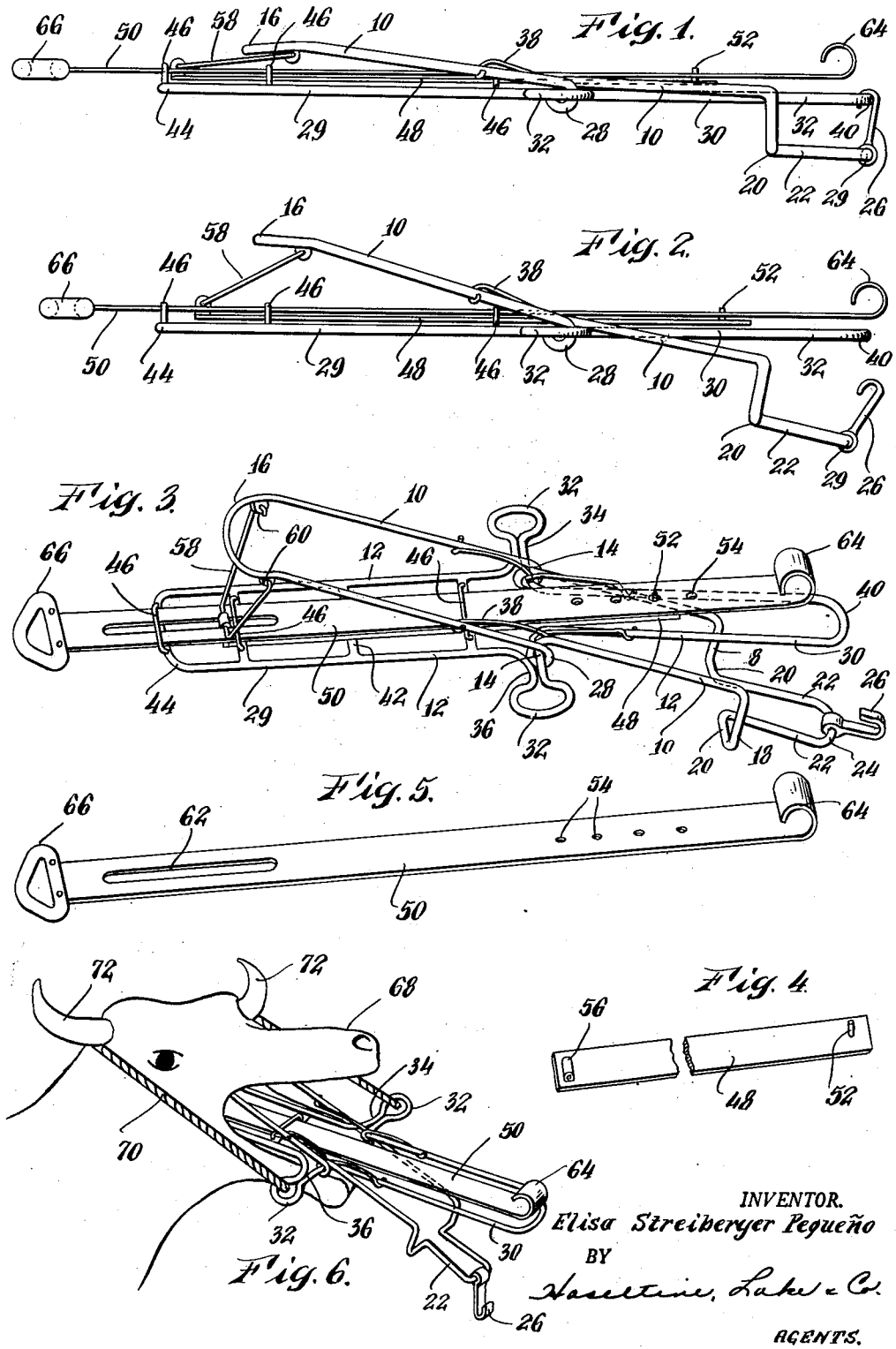

2,516,413

UNITED STATES PATENT OFFICE 2,516,413

APPARATUS FOR TREATING METEORISM OR TYMPANITES IN ANIMALS

Elisa Streiberger Pequeño, Barcelona, Spain

Application May 31, 1946, Serial No. 673,513

7 Claims. (Cl. 128—19)

My invention relates to an apparatus for relieving meteorism in animals, particularly in horned cattle.

It is an object of my invention to provide an apparatus which will provoke a vomitive irritation in the animal to which the apparatus is applied.

Other objects of my invention will become apparent from the following detailed description with reference to the appended drawings in which an embodiment of my invention is illustrated by way of example.

In the drawings:

Fig. 1 is a side elevation of an apparatus according to my invention in closed position;

Fig. 2 is a side elevation of the apparatus shown in Fig. 1 in open position;

Fig. 3 is a perspective view of the apparatus shown in Figs. 1 and 2;

Figs. 4 and 5 are perspective views of two strips, respectively, forming part of the apparatus shown in Figs. 1–3; and Fig. 6 is a diagrammatic perspective view of an animal to which the apparatus shown in Figs. 1–3 has been applied.

Referring now to the drawings, and first to Figs. 1–3, it will be seen that the apparatus comprises two members shown as first class levers 10 and 12 which are joined at 14 in scissor-like manner presently to be described more in detail. The levers are made of strong wire, lever 12 preferably being stronger than lever 10.

Lever 10 comprises parallel side portions which are joined at the front by a curved portion 16, the plane of which is slightly bent with respect to the plane of the side portions of lever 10. At the rear end lever 10 is provided on both sides with a vertically bent portion 18 which is followed by an inwardly bent portion 20 and a portion 22 running parallel to the main side portions of lever 10. The portions 22 are joined by a stirrup 24 which carries preferably a hook 26. The portions 18, 20, 22, and 24 form a depressed cradle which receives in the closed position of the levers 10 and 12 the end of lever 12, as shown in Fig. 1. In the middle of the side portions of lever 10 a loop 28 is formed on each side.

Lever 12 is substantially contained in one plane and has straight side portions 29 in the front and straight side portions 30 at the rear, the length of the latter being slightly smaller than that of the portions 29. On each side the front portions 29 and the rear portions 30 are joined by a loop 32 merging with the front and rear portions by relatively short straight portions 34 and 36, respectively. The portions 36 of lever 12 are the carrying members for the loops 28 of lever 10 so that a scissor-like connection between the two members 10 and 12 is established. A spring 38 is provided urging the two members into the open position shown in Fig. 2. At the rear the side portions 30 of lever 12 are connected by a stirrup 40 with which the hook 26 can be brought to engagement in order to hold the apparatus in its closed position shown in Fig. 1.

The front side portions 29 of lever 12 are connected by a cross-connection 42 and by a stirrup-like connection 44 arranged at the front end of the portions 29. A plurality of bridge-like members 46 are provided between the side portions 29 substantially at a slightly higher level than the latter which, together with the cross-connections 42 and 44, form guides for two strips 48 and 50.

The strips 48 and 50, separately shown in Figs. 4 and 5, respectively, have equal width and different length, strip 50 being much longer than strip 48. The strips 48 and 50 are arranged in lever 12 between the cross-connections 42 and 44 and the bridge-like members 46, strip 50 being on top of strip 48. The strip 48 is provided in its rear portion with an upwardly extending pin 52 adapted to engage one of the holes 54 provided in the rear portion of strip 50. The front portion of strip 48 carries a connection, for instance a roller 56, which is in engagement with a rotatable member, such as a stirrup or bail 58, the ends of which are articulated to two lugs 60 provided on the lower side of lever 10 approximately at the start of the curved portion 16. Roller 56 projects through an oblong slot 62 provided in strip 50. It will be seen from the foregoing that the strips 48 and 50 are adjustable with respect to each other, pin 52 engaging one of the holes 54, but in each of the adjustments the strips 48 and 50 move as a whole. The rear end of strip 50 is preferably bent to form a handle or finger piece 64, whereas at its front end preferably a piece 66 made of a relatively soft material such as vulcanite is provided.

The operation of this apparatus will now be described with special reference to Fig. 6.

The apparatus is first in the closed position shown in Fig. 1. The hook 26 is taken off the stirrup 40 and the apparatus is introduced while it is still in the closed position into the mouth 68 of the animal. A cord 70 is attached to one of the loops 32, slipped behind the horns 72 of the animal and fastened to the other loop so that the apparatus cannot slip out of the mouth of the animal. The forward end of strip 50 will come into contact with the throat of the animal, the vulcanite piece 66 rendering the contact soft. The spring 38 will now urge the levers 10 and 12 into the open position, thereby forcing the animal to open its mouth (Fig. 6). In this position the strips 48 and 50 are in their retracted position (Fig. 2) since the stirrup 58 pulls the strip 48 backwards and the latter transmits its motion by the pin 52 to the strip 50. The animal instinctively tries to close its mouth again, thereby pressing the levers 10 and 12 substantially into the closed position in which the strips 48 and 50 are moved forward by the stirrup 58 so that the piece 66 comes into touch with the throat of the animal. The repeated contacts of the piece 66 with the throat of the animal provoke a vomitive irritation which leads to the discharge of the gases and even of the liquid and solid contents from the intestines of the animal which give rise to meteorism in the animal.

It will be understood that by providing an adjustable connection between the strips 48 and 50 the apparatus may be adjusted to the size of the mouth of the animal, for smaller sizes the pin 52 being in engagement with one of the left hand holes 54. The handle 64 facilitates the adjustment of the strips.

Having now fully described my invention, what I claim as new and desire to secure by Letters Patent is:

1. Apparatus for opening the mouth of an animal to treat meteorism, including a wire frame having two substantially parallel longitudinal members united at one end and at the other ends projecting outwardly at the sides to form oppositely extending loops, further longitudinal members projecting from said loops and uniting at the ends thereof remote from the first mentioned united end, a plurality of transverse supporting members spaced apart and interconnecting spaced portions of the first mentioned longitudinal members, said wire frame forming a first class lever whereon the loops include portions forming intermediate fulcrum means, a second wire frame forming a second first class lever having two elongated members connected together at both ends with loop portions disposed upon intermediate portions of both of the latter members and engaging about the fulcrum portions of aforesaid oppositely extending loops, a strip extending between the transverse supporting members in slidable manner, a member also extending between said transverse supporting members, a stop pin fixed upon said member and normally projecting through one of a series of holes in said strip to determine different positions thereof along the first lever, a finger piece upon one end of said strip, the other end projecting beyond the first mentioned united end of said first lever and having an elongated slotted portion within said end, a bail having the ends thereof hinged to the correspondingly adjacent end of the second lever and having the intermediate projecting portion of said bail engaging said member through said slotted portion of said strip and at least one spring tending to separate the ends of said levers by swinging them apart.

2. Apparatus as claimed in claim 1, the opposite end of said second lever to that carrying said bail having a depressed cradle portion adapted to receive the corresponding end of said first lever in substantially closed position of said two levers.

3. An apparatus for treating meteorism in animals comprising a member, a strip slidably mounted on said member in the longitudinal direction thereof, a first class lever fulcrumed to said member, and means connected to said lever for sliding said strip with respect to said member in response to the angular displacement of said lever with respect to said member.

4. An apparatus for treating meteorism in animals comprising a member, a strip slidably mounted on said member in the longitudinal direction thereof, a first class lever fulcrumed to said member, resilient means arranged at the fulcrum of said lever and urging the ends of said lever away from said member, and means connected to said lever for sliding said strip with respect to said member in response to the angular displacement of said lever with respect to said member.

5. An apparatus for treating meteorism in animals comprising a member, loops on said member adapted to be connected to the head of the animal to be treated, a strip slidably mounted on said member in the longitudinal direction thereof, a first class lever fulcrumed to said member, and means connected to said lever for sliding said strip with respect to said member in response to the angular displacement of said lever with respect to said member.

6. An apparatus as claimed in claim 3, said means for sliding said strip including a second strip slidably mounted on said member, and a pin rigidly connected to said second strip and engaging one of a plurality of holes in said first-mentioned strip.

7. An apparatus as claimed in claim 6, said means for sliding said first-mentioned strip including a member rotatably connected to said lever and a connection arranged on said second strip engaging said rotatable member and protruding through a slot in said first-mentioned strip.

ELISA STREIBERGER PEQUEÑO.

REFERENCES CITED

The following references are of record in the file of this patent:

UNITED STATES PATENTS

| Number | Name | Date |
|---|---|---|
| 1,915,454 | Steigenberger | June 27, 1933 |

FOREIGN PATENTS

| Number | Country | Date |
|---|---|---|
| 744,257 | France | Jan. 21, 1933 |